US011174948B2

(12) United States Patent
Kwoka et al.

(10) Patent No.: US 11,174,948 B2
(45) Date of Patent: Nov. 16, 2021

(54) SLIDER SEAL WITH NON-CIRCULAR PUCK GEOMETRY

(71) Applicant: United Technologies Corporation, Farmington, CT (US)

(72) Inventors: David Kwoka, South Glastonbury, CT (US); Jeffery A. Lovett, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 103 days.

(21) Appl. No.: 16/523,174

(22) Filed: Jul. 26, 2019

(65) Prior Publication Data

US 2021/0025496 A1    Jan. 28, 2021

(51) Int. Cl.
    *F16J 15/44*   (2006.01)
    *F02C 7/22*    (2006.01)
    *F02C 7/28*    (2006.01)

(52) U.S. Cl.
    CPC .............. *F16J 15/441* (2013.01); *F02C 7/22* (2013.01); *F02C 7/28* (2013.01); *F05D 2220/32* (2013.01); *F05D 2240/55* (2013.01)

(58) Field of Classification Search
    CPC ... F16J 15/441; F02C 7/22; F02C 7/28; F05D 2220/32; F05D 2240/55
    See application file for complete search history.

(56) References Cited

U.S. PATENT DOCUMENTS

| 3,793,838 | A | 2/1974 | Nash |
| 8,123,228 | B2 | 2/2012 | Muldoon et al. |
| 8,196,934 | B2 | 6/2012 | Do |
| 10,190,776 | B2 | 1/2019 | Geary et al. |
| 2008/0164658 | A1* | 7/2008 | Do .................. F02C 7/28 277/355 |
| 2009/0079185 | A1 | 3/2009 | Carbines-Evans |
| 2011/0123319 | A1 | 5/2011 | Eastwood |
| 2014/0144148 | A1* | 5/2014 | Jause ................ F02C 7/28 60/772 |
| 2018/0298826 | A1 | 10/2018 | Sandiford |
| 2020/0240280 | A1* | 7/2020 | Cowan ............ F16J 15/0887 |

FOREIGN PATENT DOCUMENTS

| GB | 2038473 B | 12/1982 |
| GB | 2461503 A | 7/2008 |

OTHER PUBLICATIONS

Search report for EP20187988.9 dated Nov. 26, 2020.

* cited by examiner

*Primary Examiner* — Gilbert Y Lee
(74) *Attorney, Agent, or Firm* — Getz Balich LLC

(57) ABSTRACT

An assembly is provided that includes a slider seal having a washer and a tubular puck. The washer includes an inner washer surface and an outer washer surface. The inner washer surface extends around an axis of the slider seal and has a non-circular cross-sectional geometry. The inner washer surface forms a washer bore axially through the washer. The outer washer surface extends around the axis and has a cross-sectional geometry with a shape that is different than a shape of the non-circular cross-sectional geometry. The tubular puck projects axially through the washer bore and includes an outer puck surface. The outer puck surface extends around the axis. The outer puck surface is sealingly engaged with and configured to slide axially along the inner washer surface.

20 Claims, 12 Drawing Sheets

SLIDER SEAL WITH NON-CIRCULAR PUCK GEOMETRY

BACKGROUND OF THE DISCLOSURE

1. Technical Field

This disclosure relates generally to a seal interface and, more particularly, to a slider seal on, for example, a gas turbine engine.

2. Background Information

Apparatuses such as gas turbine engines may include seal interfaces between a stationary structure and an element projecting through an aperture in the stationary structure containing an engine internal pressure. Various types and configurations of seal interfaces such as slider seals are known in the art. While these known seal interfaces have various benefits, there is still room in the art for improvement. There is a need in the art therefore for an improved seal interface system which, for example, may reduce forces on internal components of a gas turbine engine.

SUMMARY OF THE DISCLOSURE

According to an aspect of the present disclosure, an assembly is provided for an apparatus such as a turbine engine. This assembly includes a slider seal. The slider seal includes a washer and a tubular puck. The washer includes an inner washer surface and an outer washer surface. The inner washer surface extends around an axis of the slider seal. The inner washer surface has a non-circular cross-sectional geometry. The inner washer surface forms a washer bore axially through the washer. The outer washer surface extends around the axis. The outer washer surface has a cross-sectional geometry with a shape that is different than a shape of the non-circular cross-sectional geometry. The tubular puck projects axially through the washer bore. The tubular puck includes an outer puck surface. The outer puck surface extends around the axis. The outer puck surface is sealingly engaged with and configured to slide axially along the inner washer surface.

According to another aspect of the present disclosure, an assembly is provided that includes a slider seal. The slider seal includes a housing, a washer and a tubular puck. The housing is configured with a housing bore and a housing counterbore. The housing bore extends axially along an axis of the slider seal. The housing counterbore extends axially along the axis to the housing bore. The washer is seated in and configured to move axially and/or radially within the housing counterbore. The washer includes and extends radially between an inner washer surface and an outer washer surface. The inner washer surface extends around an axis of the slider seal assembly and has a non-circular cross-sectional geometry. The inner washer surface forms a washer bore axially through the washer. The tubular puck projects axially through the washer bore and includes an outer puck surface. The outer puck surface extends around the axis. The outer puck surface is sealingly engaged with and configured to slide axially along the inner washer surface.

The washer may be sealingly configured to slide axially in the housing.

The non-circular cross-sectional geometry may be an elongated cross-sectional geometry.

The outer washer surface may extend around the axis. The outer washer surface may have a cross-sectional geometry with a shape, which may be different than a shape of the non-circular cross-sectional geometry.

The tubular puck may also include an inner puck surface. The inner puck surface may extend around the axis and may form a puck bore axially through the tubular puck. The inner puck surface may have a circular cross-sectional geometry.

The assembly may also include a first conduit projecting axially through the tubular puck. The first conduit may be fixedly mounted to and sealingly engaged with the tubular puck.

The assembly may also include a second conduit fluidly coupled with the first conduit. The second conduit may be connected to the tubular puck by one or more bolts.

The non-circular cross-sectional geometry of the inner washer surface may be an oval cross-sectional geometry.

The non-circular cross-sectional geometry of the inner washer surface may be an elongated cross-sectional geometry with a minor axis dimension and a major axis dimension that is greater than the minor axis dimension.

The cross-sectional geometry of the outer washer surface may be a circular cross-sectional geometry.

The tubular puck may also include an inner puck surface. The inner puck surface may extend around the axis and may form a puck bore axially through the tubular puck. The inner puck surface may have a cross-sectional geometry with a shape, which may be different than the shape of the non-circular cross-sectional geometry.

The assembly may also include a first conduit projecting axially through the tubular puck. The first conduit may be fixedly attached to and sealingly engaged with the tubular puck.

The assembly may also include a second conduit fluidly coupled with the first conduit. The second conduit may be connected to the tubular puck by one or more fasteners.

The assembly may also include a fluid delivery system for the turbine engine. The fluid delivery system may be configured to direct fluid through the conduit during operation of the turbine engine.

The slider seal may also include a housing. The housing may be configured with a housing bore and a housing counterbore. The housing bore may have a circular cross-sectional geometry and may extend axially along the axis. The housing counterbore may extend axially along the axis to the housing bore. The washer may be seated in the housing counterbore.

The washer may be configured to move radially and/or axially relative to the axis within the housing counterbore.

The washer may be captured within the housing counterbore by a retaining ring.

The assembly may also include a turbine engine case and a conduit. The turbine engine case may be configured as a pressure vessel for containing pressurized air. The conduit may project through and be connected to the tubular puck. The housing may be mounted to the turbine engine case. The slider seal may form a compliant seal interface between the conduit and the turbine engine case.

The washer may be configured from or otherwise include fiber-reinforced composite material. In addition or alternatively, the tubular puck may be configured from or otherwise include metal.

The foregoing features and the operation of the invention will become more apparent in light of the following description and the accompanying drawings.

DETAILED DESCRIPTION

Figure 1:
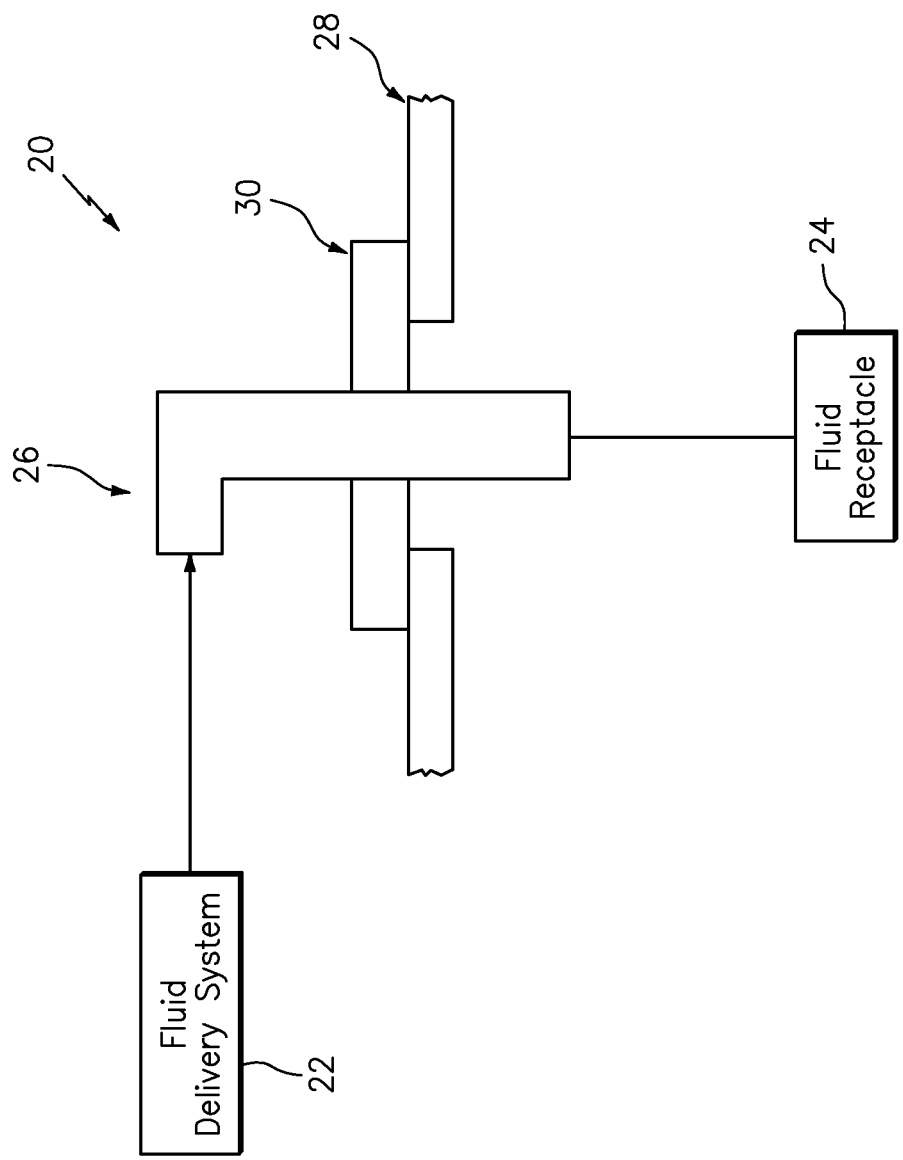
FIG. 1 is a schematic illustration of an assembly for an apparatus.
Figure 14:
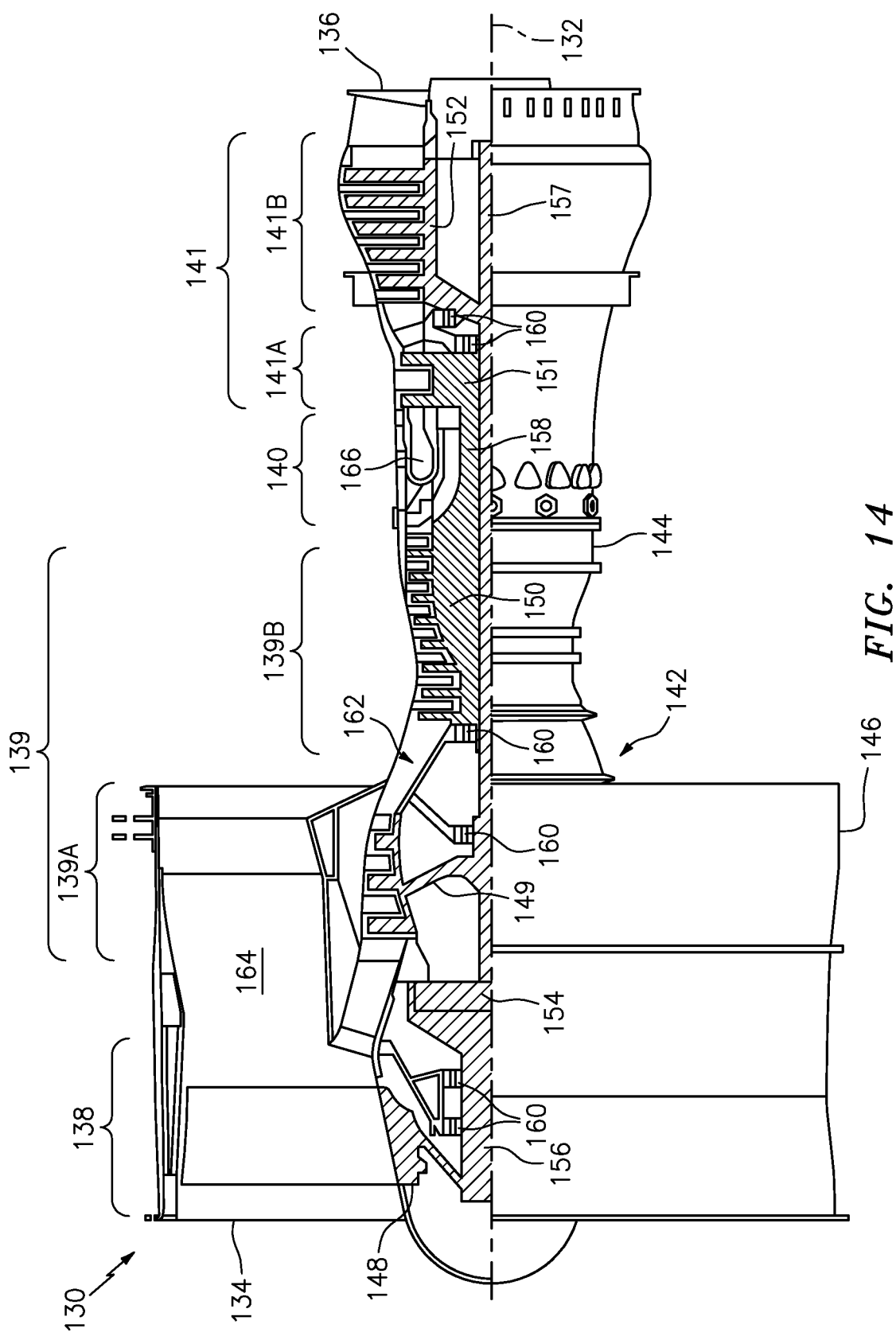
FIG. 14 is a side cutaway illustration of a geared turbine engine.

FIG. 1 is a schematic illustration of an assembly 20 for an apparatus such as, but not limited to, a turbine engine (e.g., see engine 130 in FIG. 14). Examples of such a turbine engine include, but are not limited to, an industrial gas turbine engine and an aerospace gas turbine engine such as, but not limited to, a turbofan, turbojet or turboshaft gas turbine engine. The present disclosure, however, is not limited to turbine engine applications.

The assembly 20 of FIG. 1 includes a fluid delivery system 22 (e.g., a fuel system for the turbine engine), a fluid receptacle 24 (e.g., a fuel injector for the turbine engine) and a fluid passage 26. This fluid passage 26 fluidly couples the fluid delivery system 22 with the fluid receptacle 24. The assembly 20 also includes a support structure 28 and a slider seal 30 configured to provide a compliant seal interface between the support structure 28 and the fluid passage 26 as described below in further detail. Briefly, the support structure 28 may be configured as a pressure vessel for containing pressurized gas (e.g., air) inside the apparatus (e.g., the engine 130) with respect to a surrounding lower outside atmospheric pressure.

Figure 2:
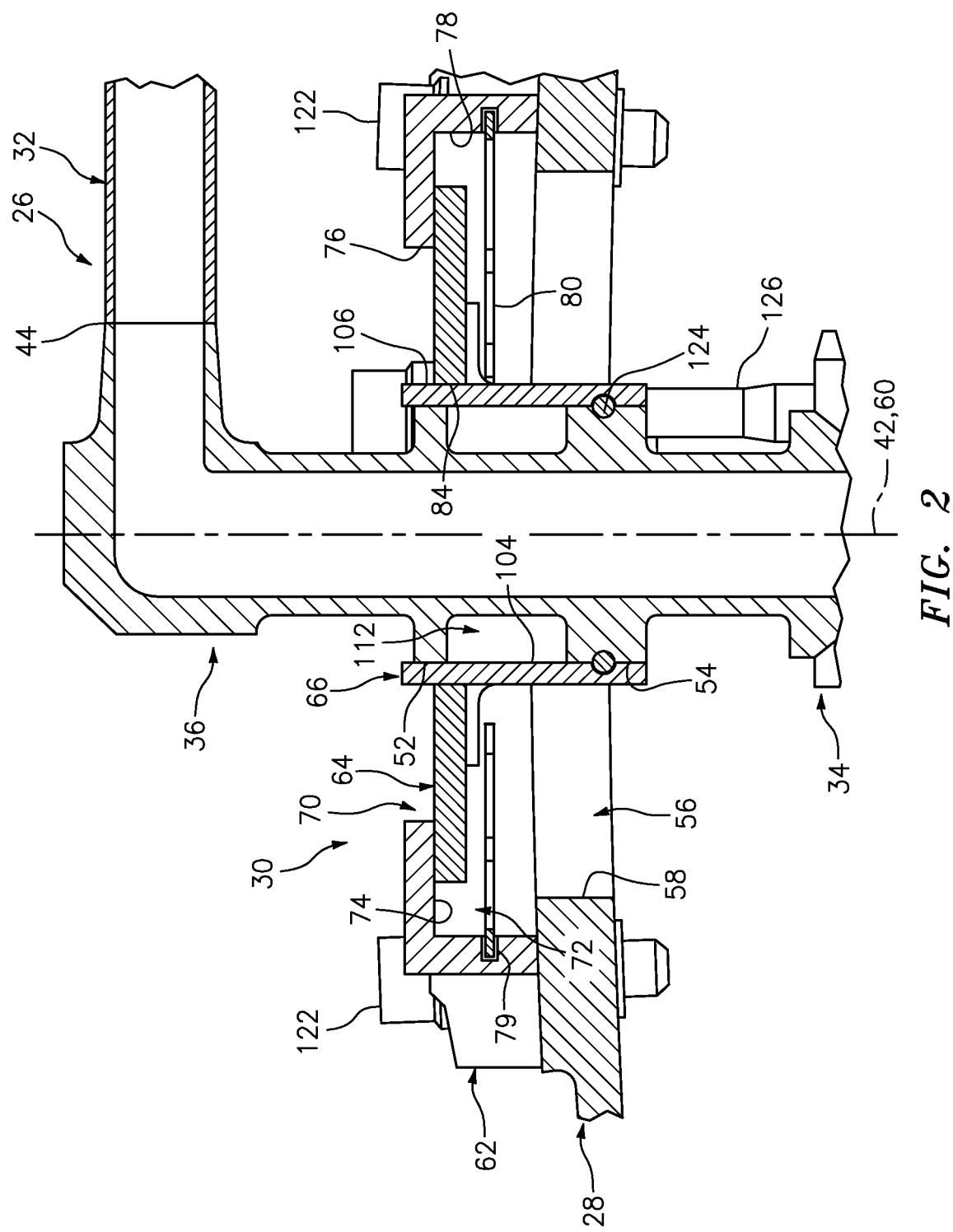
FIGS. 2 and 3 are perspective side sectional illustrations of a portion of the assembly of FIG. 1.
Figure 3:
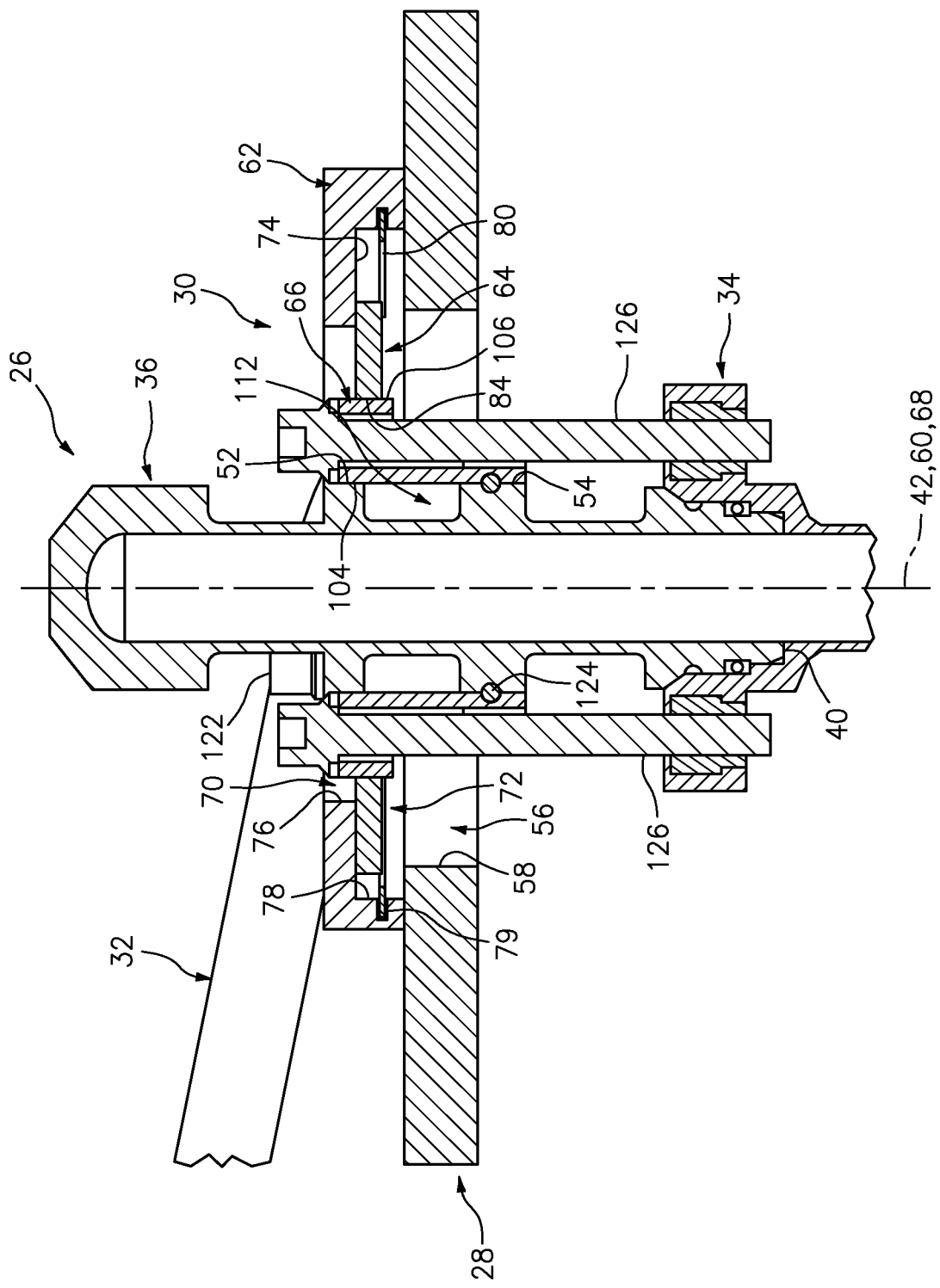

Referring to FIGS. 2 and 3, the fluid passage 26 may be configured from one or more fluid conduits (e.g., rigid pipes and/or flexible hoses); e.g., a linear array of fluidly coupled fluid conduits. The portion of the fluid passage 26 shown in FIGS. 2 and 3, for example, includes an exterior fluid conduit 32, an interior fluid conduit 34 and a slider seal fluid conduit 36.

Figure 4:
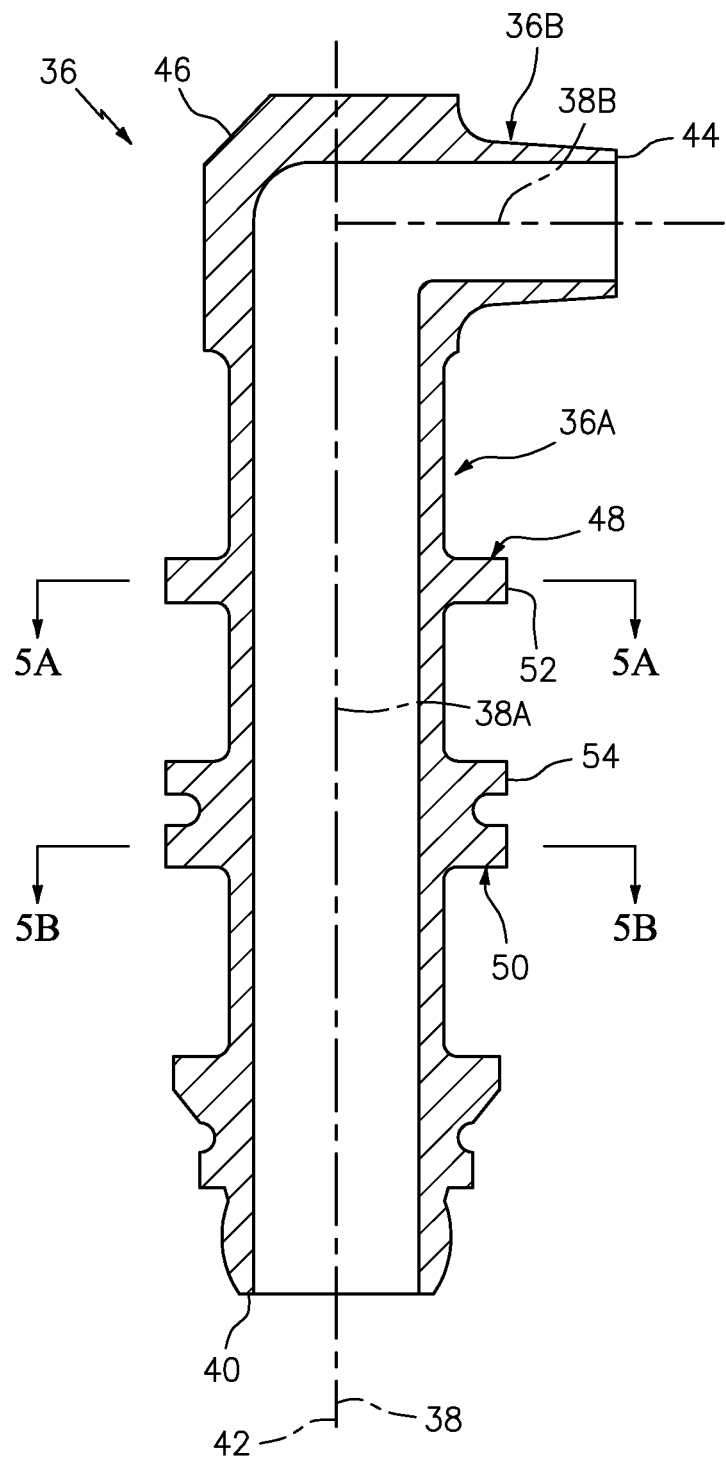
FIG. 4 is a side sectional illustration of a slider seal fluid conduit.

The slider seal fluid conduit 36 of FIG. 4 includes a first conduit segment 36A and a second conduit segment 36B. The first conduit segment 36A may be a length of tubular body that extends longitudinally along a first portion 38A of a longitudinal centerline 38 of the conduit 36 from a distal interior end 40 of the conduit 36 towards (e.g., to) the second conduit segment 36B. The first portion 38A of the longitudinal centerline 38 of FIG. 4 is parallel to (e.g., coaxial with) an axis 42 of the slider seal 30. The second conduit segment 36B may be another length of tubular body that extends longitudinally along a second portion 38B of the longitudinal centerline 38 of the conduit 36 from a distal exterior end 44 of the conduit 36 towards (e.g., to) the first conduit segment 36A. The second portion 38B of the longitudinal centerline 38 may be angularly offset from (e.g., acutely or obtusely angled, or perpendicular to) the axis 42 of the slider seal 30 and/or the first portion 38A of the longitudinal centerline 38. The second conduit segment 36B is fluidly is connected to (e.g., formed integral with) the first conduit segment 36A at a corner joint 46; e.g., an elbow joint or fitting.

Figure 5A:
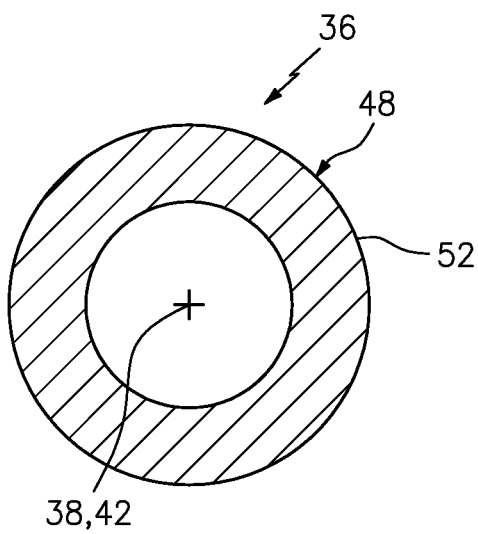
FIG. 5A is a cross-sectional illustration of the slider seal fluid conduit taken along line 5A-5A in FIG. 4.
Figure 5B:
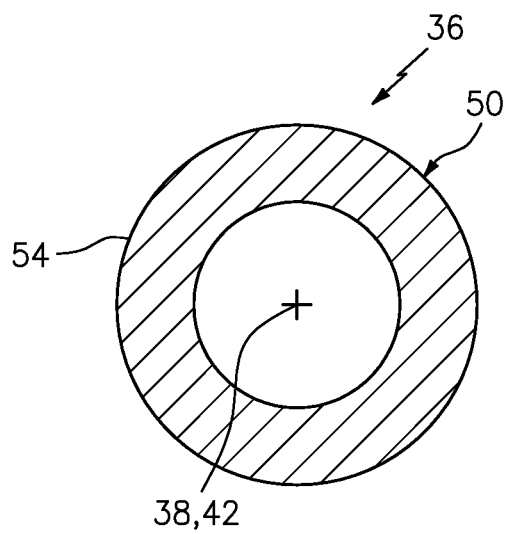
FIG. 5B is a cross-sectional illustration of the slider seal fluid conduit taken along line 5B-5B in FIG. 4.

The slider seal fluid conduit 36 of FIG. 4 also includes one or more (e.g., annular) flanges 48 and 50 or rims. The exterior flange 48 extends circumferentially around the longitudinal centerline 38 and a tubular sidewall of the conduit 36. The exterior flange 48 projects radially out from the tubular sidewall to an outer (e.g., peripheral) exterior flange surface 52. Similarly, the interior flange 50 extends circumferentially around the longitudinal centerline 38 and the tubular sidewall. The interior flange 50 projects radially out from the tubular sidewall to an outer (e.g., peripheral) interior flange surface 54. Referring to FIGS. 5A and 5B, each of the flange surfaces 52, 54 may have a circular cross-sectional geometry when respectively viewed in a plane perpendicular to the centerline 38 and/or the axis 42.

The exterior flange 48 of FIG. 4 is arranged between the interior flange 50 and the corner joint 46. The interior flange 50 is arranged between the exterior flange 48 and the distal interior end 40 of the conduit 36.

Figure 6:
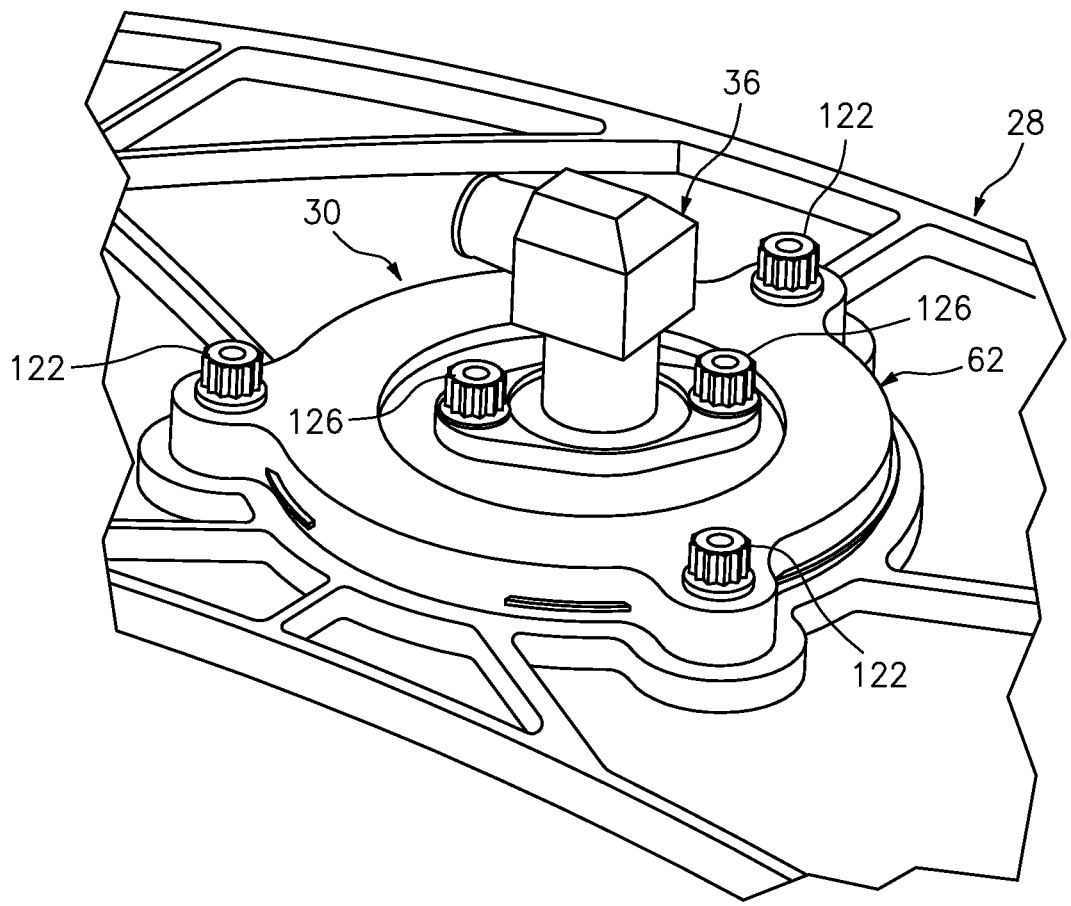
FIG. 6 is a partial exterior view perspective illustration of the assembly portions shown in FIGS. 2 and 3.
Figure 7:
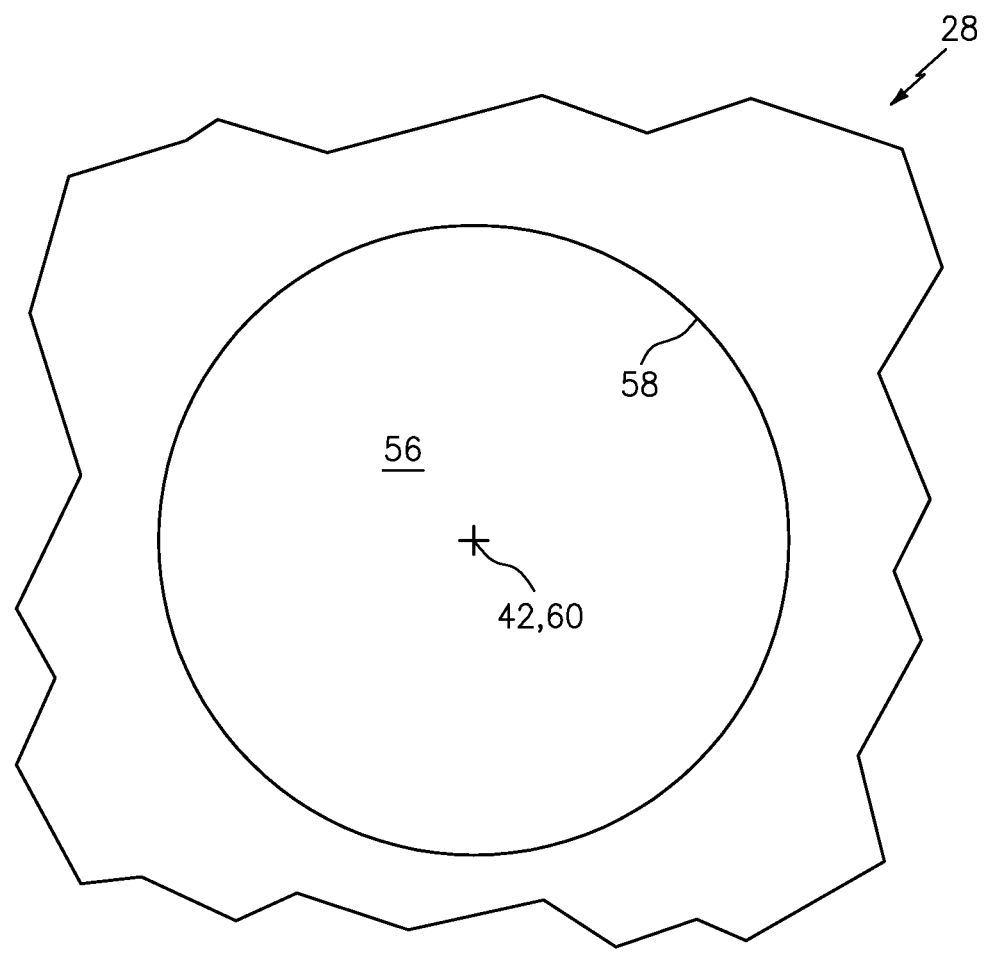
FIG. 7 is a partial exterior view illustration of a support structure.

Referring to FIG. 6, the support structure 28 may be configured as a turbine engine case; e.g., a tubular casing such as a fan duct case. Referring to FIGS. 2 and 3, the support structure 28 is configured with a (e.g., stationary) support structure aperture 56 formed by an aperture surface 58. This support structure aperture 56 and the aperture surface 58 extend axially along an axis 60 through the support structure 28 between interior and exterior sides of the support structure 28. The axis 60 may be parallel to (e.g., coaxial with or non-coaxial with depending upon thermal growth of the assembly 20) the axis 42 of the slider seal 30. Referring to FIG. 7, the support structure aperture 56 and the aperture surface 58 may each have a circular cross-sectional geometry when respectively viewed in a plane perpendicular to the axis 42, 60.

Referring to FIGS. 2 and 3, the slider seal 30 includes a slider seal housing 62, a slider seal washer 64 and a slider seal puck 66; e.g., a tubular puck/bushing. Relative motion, for example in one or more or all directions, between the slider seal fluid conduit 36 and the support structure aperture 56 is accommodated by (a) sliding of the slider seal washer 64 and/or (b) sliding of the slider seal puck 66 relative to the slider seal washer 64.

The slider seal housing 62 is an annular body (see FIG. 6) which extends circumferentially around an axis 68, which may be parallel to (e.g., coaxial with or non-coaxial with depending upon thermal growth of the assembly 20) the axis 42 of the slider seal 30. The slider seal housing 62 is configured with a housing bore 70 and a housing counterbore 72. The housing bore 70 extends axially along the axis 68 into the housing 62 from an exterior side of the housing to an inner edge of an annular shelf surface 74. The housing counterbore 72 extends axially along the axis 68 into the housing 62 from an interior side of the housing to the annular shelf surface 74 and the housing bore 70.

Figure 8:
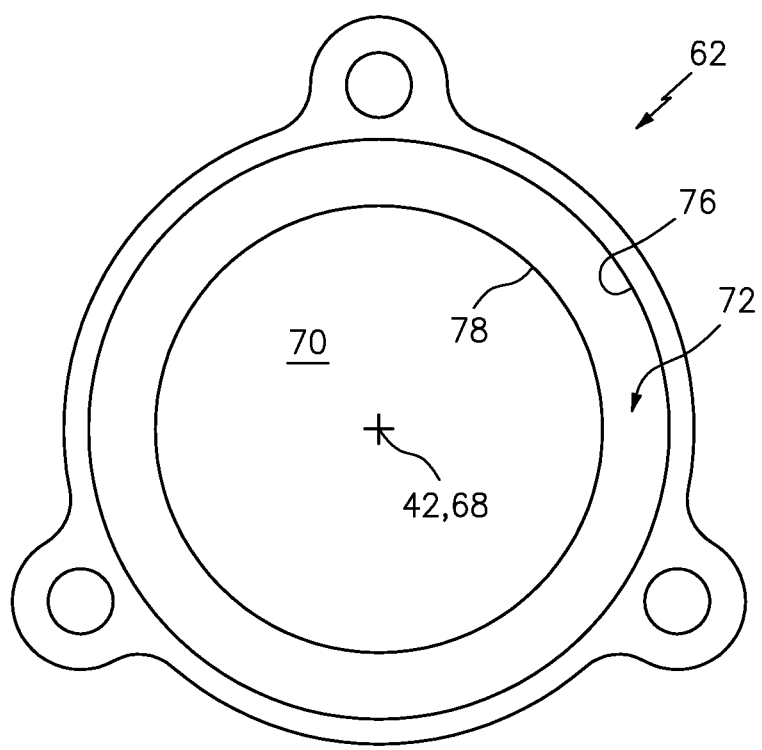
FIG. 8 is an interior view illustration of a slider seal housing.

The housing bore 70 may be formed by a bore surface 76. The housing counterbore 72 may be formed by a counterbore surface 78. Referring to FIG. 8, the housing bore 70 and the associated bore surface 76 and/or the housing counterbore 72 and the associated counterbore surface 78 may each have a circular cross-sectional geometry when respectively viewed in a plane perpendicular to the axis 42, 68.

The slider seal housing 62 of FIGS. 2 and 3 may also be configured with a (e.g., annular) slot 79. This slot 79 projects radially into the slider seal housing 62 from the housing counterbore 72. The slot 79 is configured to receive a capture device 80 such as, but not limited to, a retaining ring as shown in FIGS. 2 and 3.

Figure 9:
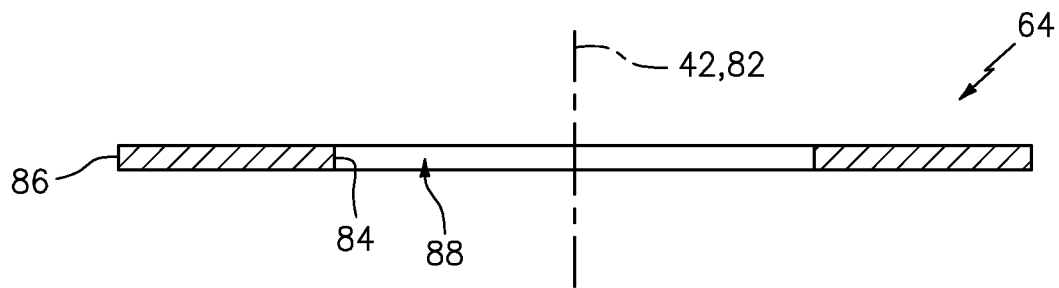
FIG. 9 is a side sectional illustration of a slider seal washer taken along line 9-9 in FIG. 10.
Figure 10:
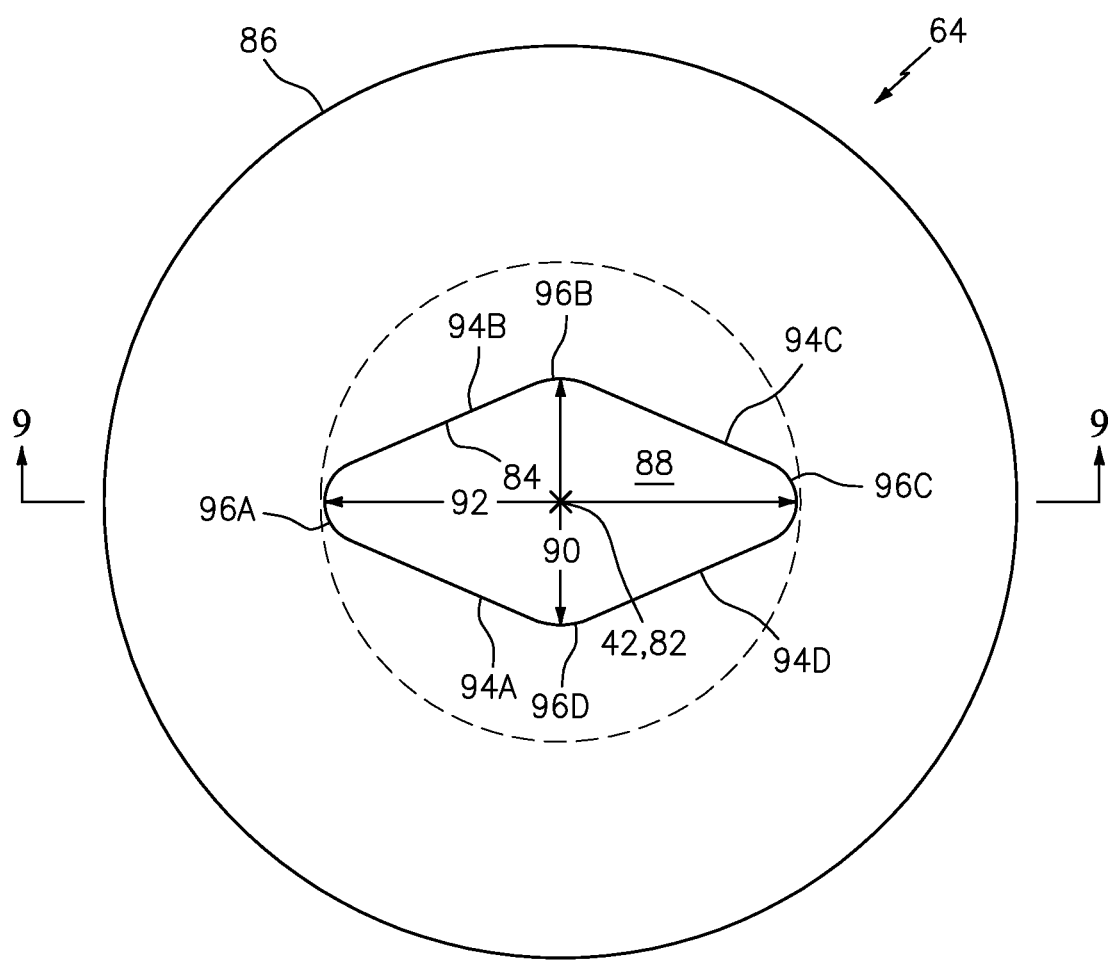
FIG. 10 is an exterior view illustration of the slider seal washer.

Referring to FIGS. 9 and 10, the slider seal washer 64 is an annular body which extends circumferentially around an axis 82, which may be parallel to (e.g., coaxial with) the axis 42 of the slider seal 30. The slider seal washer 64 extends radially from an inner (e.g., peripheral) washer surface 84 to an outer (e.g., peripheral) washer surface 86. Each of these surfaces 84, 86 extends axially along the axis 42, 82 between opposing interior and exterior sides of the slider seal washer 64.

The inner washer surface 84 extends circumferentially around the axis 42, 82. The inner washer surface 84 thereby forms a washer bore 88 axially along the axis 42, 82 through the slider seal washer 64. The inner washer surface 84 has a non-circular cross-sectional geometry (see FIG. 10) when viewed in a plane perpendicular to the axis 42, 82. This non-circular cross-sectional geometry of FIG. 10 has a minor axis dimension 90 and a major axis dimension 92 that is greater than the minor axis dimension 90. The term "minor axis" may describe a minimum (shortest) diameter of an elongated shape such as an oval or an ellipse, which diameter extends through a center of the elongated shape. The term "major axis" may describe a maximum (longest) diameter of an elongated shape such as an oval or an ellipse, which diameter extends through a center of the elongated shape. The non-circular cross-sectional geometry, for example, may be an oval cross-sectional geometry or a diamond cross-sectional geometry with one or more rounded corners.

In the specific embodiment of FIG. 10, the non-circular cross-sectional geometry includes a plurality of straight side segments 94A-94D and a plurality of curved side segments 96A-96D. The first and the second straight side segments 94A and 94B are joined by the first curved side segment 96A at a first corner, where the first and the second straight side segments 94A and 94B are angularly offset by a first acute angle. The third and the fourth straight side segments 94C and 94D are joined by the third curved side segment 96C at a third corner, where the third and the fourth straight side segments 94C and 94D are angularly offset by a second acute angle which may be equal to the first acute angle. The first and the fourth straight side segments 94A and 94D are joined by the fourth curved side segment 96D at a fourth corner, where the first and the fourth straight side segments 94A and 94D are angularly offset by a first obtuse angle. The second and the third straight side segments 94B and 94C are joined by the second curved side segment 96C at a second corner, where the second and the third straight side segments 94B and 94C are angularly offset by a second obtuse angle which may be equal to the first obtuse angle. The present disclosure, of course, is not limited to the foregoing exemplary non-circular cross-sectional geometry. In other embodiments, for example, the non-circular cross-sectional geometry may have any shape which decreases an area of the geometry relative to a circle; e.g., see dashed line in FIG. 10.

The outer washer surface 86 extends circumferentially around the axis 42, 82. The outer washer surface 86 may have a circular cross-sectional geometry (see FIG. 10) when viewed in a plane perpendicular to the axis 42, 82. Thus, a shape of the cross-sectional geometry of the outer washer surface 86 may be different than a shape of the non-circular cross-sectional geometry of the inner washer surface 84.

Figure 11:
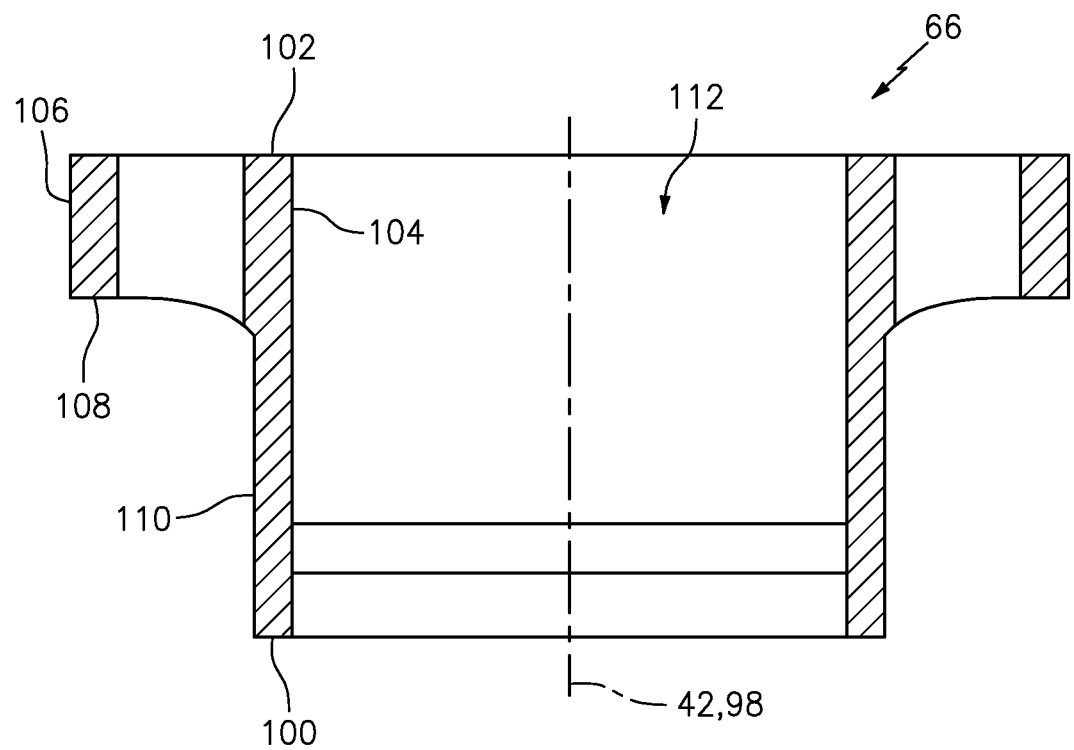
FIG. 11 is a side sectional illustration of a slider seal puck taken along line 11-11 in FIG. 12.
Figure 12:
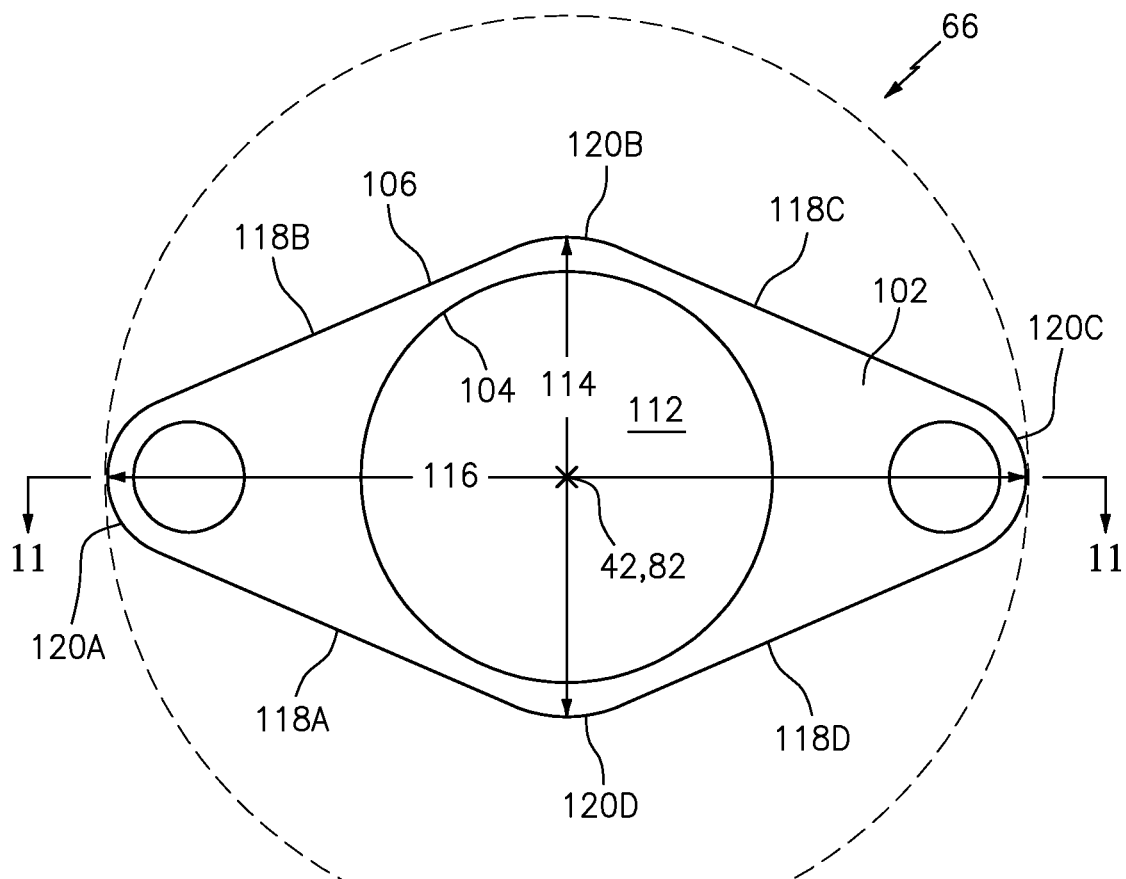
FIG. 12 is an exterior view illustration of the slider seal puck.

Referring to FIGS. 11 and 12, the slider seal puck 66 is configured with a tubular body. The slider seal puck 66 extends axially along an axis 98 between opposing interior and exterior ends 100 and 102, which axis 98 may be parallel to (e.g., coaxial with) the axis 42 of the slider seal 30. The slider seal puck 66 extends circumferentially around the axis 42, 98. The slider seal puck 66 extends radially from an inner (e.g., peripheral) puck surface 104 to an outer (e.g., peripheral) puck surface 106. In the specific embodiment of FIG. 11, the inner puck surface 104 extends axially along the axis 42, 98 between the interior and the exterior ends 100 and 102. The outer puck surface 106 extends axially along the axis 42, 98 from the exterior end 102 towards the interior end 100 and, more particularly, to an outer edge of an annular shelf surface 108. Another outer surface 110 of the slider seal puck 66 extends axially along the axis 42, 98 from an inner edge of the annular shelf surface 108 to the interior end 100 of the puck 66.

The inner puck surface 104 extends circumferentially around the axis 42, 98. The inner puck surface 104 thereby forms a puck bore 112 axially along the axis 42, 98 through the slider seal puck 66. The inner puck surface 104 may have a circular cross-sectional geometry (see FIG. 12) when viewed in a plane perpendicular to the axis 42, 98.

The outer puck surface 106 extends circumferentially around the axis 42, 98. The outer puck surface 106 has a non-circular cross-sectional geometry (see FIG. 12) when viewed in a plane perpendicular to the axis 42, 98. This non-circular cross-sectional geometry is configured to match the non-circular cross-sectional geometry of the inner washer surface 84 (see FIG. 10). In particular, the non-circular cross-sectional geometry of FIG. 12 has a minor axis dimension 114 and a major axis dimension 116 that is greater than the minor axis dimension 114. The minor axis dimension 114 may be equal to (or slightly smaller) than the minor axis dimension 90 (see FIG. 10). The major axis dimension may be equal to (or slightly smaller) than the major axis dimension 92 (see FIG. 10). The non-circular cross-sectional geometry may be an oval cross-sectional geometry or a diamond cross-sectional geometry with one or more rounded corners. Thus, a shape of the non-circular cross-sectional geometry of the outer puck surface 106 may be different than a shape of the cross-sectional geometry of the inner puck surface 104.

In the specific embodiment of FIG. 12, the non-circular cross-sectional geometry includes a plurality of straight side segments 118A-D and a plurality of curved side segments 120A-D. The first and the second straight side segments 118A and 118B are joined by the first curved side segment 120A at a first corner, where the first and the second straight side segments 118A and 118B are angularly offset by a first acute angle. The third and the fourth straight side segments 118C and 118D are joined by the third curved side segment 120C at a third corner, where the third and the fourth straight side segments 118C and 118D are angularly offset by a second acute angle which may be equal to the first acute angle. The first and the fourth straight side segments 118A and 118D are joined by the fourth curved side segment 120D at a fourth corner, where the first and the fourth straight side segments 118A and 118D are angularly offset by a first obtuse angle. The second and the third straight side segments 118B and 118C are joined by the second curved side segment 120B at a second corner, where the second and the third straight side segments 118B and 118C are angularly offset by a second obtuse angle which may be equal to the first obtuse angle. The present disclosure, of course, is not limited to the foregoing exemplary non-circular cross-sectional geometry. In other embodiments, for example, the non-circular cross-sectional geometry may have any shape which decreases an area of the geometry relative to a circle; e.g., see dashed line in FIG. 12.

Referring to FIGS. 2 and 3, the slider seal housing 62 is mounted to the support structure 28. For example, the slider seal housing 62 may be attached to the support structure 28 by one or more fasteners 122 (e.g., bolts) as shown in FIG. 6. The slider seal washer 64 is nested within the housing counterbore 72 and the slider seal washer 64 is captured within the housing counterbore 72 by the capture device 80; e.g., retaining ring. A diameter of the housing counterbore 72 may be greater than a diameter of the outer washer surface 86, which enables the slider seal washer 64 to move radially (e.g., relative to the axis 42) within the housing counterbore 72. Furthermore, an axial distance between the capture device 80 and the annular shelf surface 74 may be greater than an axial thickness of the slider seal washer 64, which enables the slider seal washer 64 to move axially (e.g., relative to the axis 42) within the housing counterbore 72. Such movement enables accommodation of dimensional variation due to material thermal expansion.

The slider seal puck 66 is mated with the slider seal washer 64. In particular, the slider seal puck 66 is inserted into the washer bore 88 such that the slider seal puck 66 projects axially through the slider seal washer 64. The outer puck surface 106 radially sealingly engages (e.g., contacts) the inner washer surface 84, thereby forming a seal interface between the slider seal puck 66 and the slider seal washer 64. The outer puck surface 106 is configured to axially slide along the inner washer surface 84, which enables the slider seal puck 66 to move axially (e.g., relative to the axis 42) relative to the slider seal washer 64. Such movement further enables accommodation of dimensional variation due to material thermal expansion.

The slider seal fluid conduit 36 is mated with the slider seal puck 66. In particular, the slider seal fluid conduit 36 is inserted into the puck bore 112 such that the slider seal fluid conduit 36 projects axially through the slider seal puck 66. Each of the flange surface 52, 54 may radially sealingly engage (e.g., contact) the inner puck surface 104, thereby forming a seal interface between the slider seal puck 66 and the slider seal fluid conduit 36. The slider seal fluid conduit 36 is mounted to the slider seal puck 66. For example, the slider seal fluid conduit 36 may be fixedly attached to the slider seal puck 66. In the specific embodiment of FIGS. 2 and 3, the slider seal fluid conduit 36 is fixedly attached to the slider seal puck 66 via thrust wire 124. The present disclosure, however, is not limited to any particular technique or device(s) for fixedly connecting the slider seal fluid conduit 36 to the slider seal puck 66.

The distal exterior end 44 of the slider seal fluid conduit 36 is fluidly coupled with the exterior fluid conduit 32 (see FIG. 2). The distal interior end 40 of the slider seal fluid conduit 36 is fluidly coupled with the interior fluid conduit 34 (see FIG. 3). For example, the distal interior end 34 of the slider seal fluid conduit 36 may be inserted into a receptacle at a distal end of the interior fluid conduit 34. The interior fluid conduit 34 may then be attached to the slider seal puck 66 by one or more fasteners 126; e.g., bolts. These fasteners 126 may be torqued to form a seal interface between the fluid conduits 34 and 36. The present disclosure, of course, is not limited to the foregoing exemplary fluid conduit interconnection technique.

Figure 13:
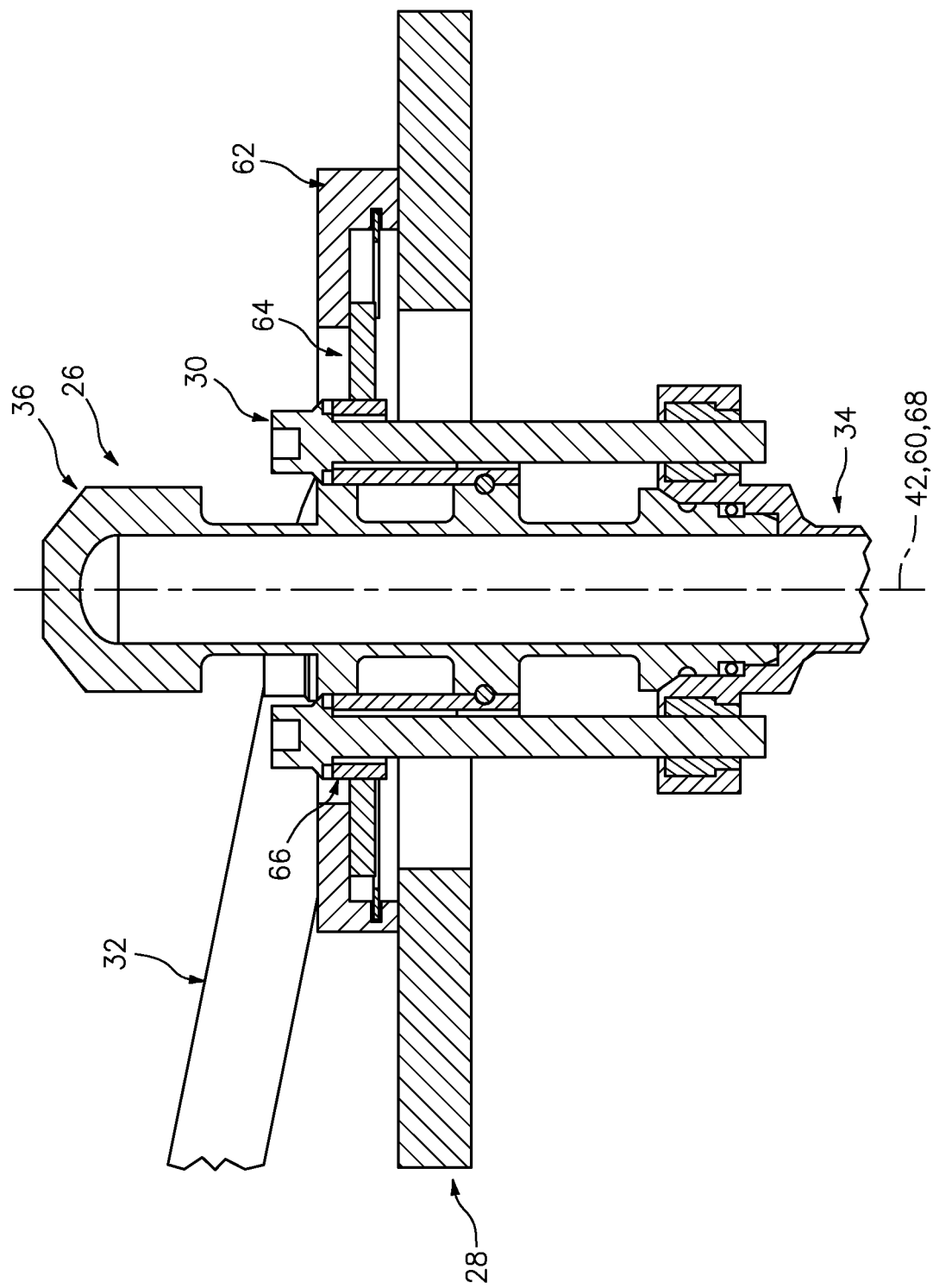
FIG. 13 is another perspective sectional illustration of a portion of the assembly of FIG. 1.

Referring to FIG. 13, during operation of the turbine engine, gas (e.g., air) pressure within the support structure 28 may be greater than gas (e.g., air) pressure outside of the support structure 28. As a result, the slider seal puck 66 may be subject to an outward pressure force (e.g., see pressure force arrow 128) imparting force on the fluid receptacle 24 (see FIG. 1). Due to the fixed connection between the slider seal puck 66 and the slider seal fluid conduit 36, the outward pressure force may cause the slider seal puck 66 to pull against the slider seal fluid conduit 36 and, thus, the fluid passage 26 and the components attached thereto. However, this outward pressure force is mitigated by providing the outer puck surface 106 with its non-circular cross-sectional geometry. In particular, as described above with respect to FIG. 12, the non-circular cross-sectional geometry has less area than a circular cross-sectional geometry (see dashed line) and, thus, provides the slider seal puck 66 with less surface area against which gas pressure may be exerted, thereby reducing force on the fluid conduit 36 and attached components such as, for example, the fluid receptacle (see FIG. 1). In addition, a relatively small perimeter provided by the non-circular cross-sectional geometry may reduce area for gas leakage relative to a perimeter of a circular cross-sectional geometry.

In some embodiments, the slider seal washer 64 may be constructed from or otherwise include non-metal material such as, but not limited to, fiber-reinforced composite material. The present disclosure, however, is not limited to such an exemplary washer material.

In some embodiments, the slider seal puck 66 may be constructed from or otherwise include metal material. The present disclosure, however, is not limited to such an exemplary puck material.

FIG. 14 is a side cutaway illustration of a geared turbine engine 130 with which the assembly 20 may be included. This turbine engine 130 extends along an axial centerline 132 between an upstream airflow inlet 134 and a downstream airflow exhaust 136. The turbine engine 130 includes a fan section 138, a compressor section 139, a combustor section 140 and a turbine section 141. The compressor section 139 includes a low pressure compressor (LPC) section 139A and a high pressure compressor (HPC) section 139B. The turbine section 141 includes a high pressure turbine (HPT) section 141A and a low pressure turbine (LPT) section 141B.

The engine sections 138-141 are arranged sequentially along the centerline 132 within an engine housing 142, which may include the support structure 28 of FIGS. 2 and 3. The housing 142 of FIG. 14 includes an inner case 144 (e.g., a core case) and an outer case 146 (e.g., a fan case). The inner case 144 may house one or more of the engine sections 139-141; e.g., an engine core. The outer case 146 may house at least the fan section 138.

Each of the engine sections 138, 139A, 139B, 141A and 141B includes a respective rotor 148-152. Each of these rotors 148-152 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 148 is connected to a gear train 154, for example, through a fan shaft 156. The gear train 154 and the LPC rotor 149 are connected to and driven by the LPT rotor 152 through a low speed shaft 157. The HPC rotor 150 is connected to and driven by the HPT rotor 151 through a high speed shaft 158. The shafts 156-158 are rotatably supported by a plurality of bearings 160; e.g., rolling element and/or thrust bearings. Each of these bearings 160 is connected to the engine housing 142 by at least one stationary structure such as, for example, an annular support strut.

During operation, air enters the turbine engine 130 through the airflow inlet 134. This air is directed through the fan section 138 and into a core gas path 162 and a bypass gas path 164. The core gas path 162 extends sequentially through the engine sections 139-141. The air within the core gas path 162 may be referred to as "core air". The bypass gas path 164 extends through a bypass duct, which bypasses the engine core. The air within the bypass gas path 164 may be referred to as "bypass air".

The core air is compressed by the compressor rotors 149 and 150 and directed into a combustion chamber 166 of a combustor in the combustor section 140. Fuel is injected into the combustion chamber 166 and mixed with the compressed core air to provide a fuel-air mixture. This fuel air mixture is ignited and combustion products thereof flow through and sequentially cause the turbine rotors 151 and 152 to rotate. The rotation of the turbine rotors 151 and 152 respectively drive rotation of the compressor rotors 150 and 149 and, thus, compression of the air received from a core airflow inlet. The rotation of the turbine rotor 152 also drives rotation of the fan rotor 148, which propels bypass air through and out of the bypass gas path 164. The propulsion of the bypass air may account for a majority of thrust generated by the turbine engine 130, e.g., more than seventy-five percent (75%) of engine thrust. The turbine engine 130 of the present disclosure, however, is not limited to the foregoing exemplary thrust ratio.

The assembly 20 and/or its slider seal 30 may be included in various turbine engines other than the one described above as well as in other types of equipment. The assembly 20 and/or its slider seal 30, for example, may be included in a geared turbine engine where a gear train connects one or more shafts to one or more rotors in a fan section, a compressor section and/or any other engine section. Alternatively, the assembly 20 and/or its slider seal 30 may be included in a turbine engine configured without a gear train. The assembly 20 and/or its slider seal 30 may be included in a geared or non-geared turbine engine configured with a single spool, with two spools (e.g., see FIG. 14), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
  a slider seal including a washer and a tubular puck;
  the washer including an inner washer surface and an outer washer surface, the inner washer surface extending around an axis of the slider seal and having a non-circular cross-sectional geometry, the inner washer surface forming a washer bore axially through the washer, and the outer washer surface extending around the axis of the slider seal and having a cross-sectional geometry with a shape that is different than a shape of the non-circular cross-sectional geometry; and
  the tubular puck projecting axially through the washer bore and including an outer puck surface, the outer puck surface extending around the axis of the slider seal, and the outer puck surface sealingly engaged with and configured to slide axially along the inner washer surface;
  wherein an axis of the washer and an axis of the tubular puck are parallel with the axis of the slider seal.

2. The assembly of claim 1, wherein the non-circular cross-sectional geometry of the inner washer surface is an oval cross-sectional geometry.

3. The assembly of claim 1, wherein the cross-sectional geometry of the outer washer surface is a circular cross-sectional geometry.

4. The assembly of claim 1, wherein
  the tubular puck further includes an inner puck surface; and
  the inner puck surface extends around the axis of the slider seal and forms a puck bore axially through the tubular puck.

5. The assembly of claim 4, wherein the inner puck surface has a cross-sectional geometry with a shape that is different than the shape of the non-circular cross-sectional geometry.

6. The assembly of claim 1, further comprising a first conduit projecting axially through the tubular puck, the first conduit fixedly attached to and sealingly engaged with the tubular puck.

7. The assembly of claim 6, further comprising a second conduit fluidly coupled with the first conduit, the second conduit connected to the tubular puck by one or more fasteners.

8. The assembly of claim 6, further comprising a fluid delivery system for the turbine engine, the fluid delivery system configured to direct fluid through the conduit during operation of the turbine engine.

9. The assembly of claim 1, wherein
  the slider seal further includes a housing;
  the housing is configured with a housing bore and a housing counterbore;
  the housing bore has a circular cross-sectional geometry and extends axially along the axis of the slider seal;
  the housing counterbore extends axially along the axis of the slider seal to the housing bore; and
  the washer is seated in the housing counterbore.

10. The assembly of claim 9, wherein the washer is configured to move radially and/or axially relative to the axis of the slider seal within the housing counterbore.

11. The assembly of claim 9, wherein the washer is captured within the housing counterbore by a retaining ring.

12. The assembly of claim 9, further comprising:
  a turbine engine case configured as a pressure vessel for containing pressurize air; and
  a conduit projecting through and connected to the tubular puck;
  the housing mounted to the turbine engine case; and
  the slider seal forming a compliant seal interface between the conduit and the turbine engine case.

13. The assembly of claim 1, wherein
the washer comprises fiber-reinforced composite material; and
the tubular puck comprises metal.

14. An assembly for a turbine engine, comprising:
a slider seal including a washer and a tubular puck;
the washer including an inner washer surface and an outer washer surface, the inner washer surface extending around an axis of the slider seal and having a non-circular cross-sectional geometry, the inner washer surface forming a washer bore axially through the washer, and the outer washer surface extending around the axis and having a cross-sectional geometry with a shape that is different than a shape of the non-circular cross-sectional geometry, wherein the non-circular cross-sectional geometry of the inner washer surface is an elongated cross-sectional geometry with a minor axis dimension and a major axis dimension that is greater than the minor axis dimension, and the elongated cross-sectional geometry comprises a plurality of straight segments; and
the tubular puck projecting axially through the washer bore and including an outer puck surface, the outer puck surface extending around the axis, and the outer puck surface sealingly engaged with and configured to slide axially along the inner washer surface.

15. An assembly, comprising:
a slider seal including a housing, a washer and a tubular puck;
the housing configured with a housing bore and a housing counterbore, the housing bore extending axially along an axis of the slider seal, and the housing counterbore extending axially along the axis to the housing bore;
the washer seated in and configured to move axially and/or radially within the housing counterbore, the washer including and extending radially between an inner washer surface and an outer washer surface, the inner washer surface extending around the axis and having a non-circular cross-sectional geometry, and the inner washer surface forming a washer bore axially through the washer; and
the tubular puck projecting axially through the washer bore and including an outer puck surface, the outer puck surface extending around the axis, and the outer puck surface sealingly engaged with and configured to slide axially along the inner washer surface; and
a first conduit projecting axially through the tubular puck, the first conduit fixedly mounted to and sealingly engaged with the tubular puck.

16. The assembly of claim 15, wherein the non-circular cross-sectional geometry is an elongated cross-sectional geometry.

17. The assembly of claim 15, wherein
the outer washer surface extends around the axis; and
the outer washer surface has a cross-sectional geometry with a shape that is different than a shape of the non-circular cross-sectional geometry.

18. The assembly of claim 15, wherein
the tubular puck further includes an inner puck surface;
the inner puck surface extends around the axis and forms a puck bore axially through the tubular puck; and
the inner puck surface has a circular cross-sectional geometry.

19. The assembly of claim 15, further comprising a second conduit fluidly coupled with the first conduit, the second conduit connected to the tubular puck by one or more bolts.

20. The assembly of claim 15, wherein
the first conduit includes an annular flange;
the annular flange includes and projects radially out to an outer flange surface; and
the outer flange surface sealingly engages an inner puck surface of the tubular puck.

* * * * *